Oct. 18, 1949.  W. W. PAGET  2,484,847
PRESSURE CONTROLLING APPARATUS
Filed July 30, 1942  8 Sheets-Sheet 1

Inventor:
Win W. Paget.
by
[signature]
Atty.

Oct. 18, 1949.  W. W. PAGET  2,484,847
PRESSURE CONTROLLING APPARATUS
Filed July 30, 1942  8 Sheets-Sheet 2

Fig. 3.

Inventor:
Win W. Paget.
by
Louis A. Maxson.
Atty.

Oct. 18, 1949.   W. W. PAGET   2,484,847
PRESSURE CONTROLLING APPARATUS
Filed July 30, 1942   8 Sheets-Sheet 3

Inventor:
Win W. Paget.
by
Louis A. Maxson
Atty.

Oct. 18, 1949.  W. W. PAGET  2,484,847
PRESSURE CONTROLLING APPARATUS
Filed July 30, 1942  8 Sheets-Sheet 5

Inventor:
Win W. Paget.
by
[signature]
Atty.

Patented Oct. 18, 1949

2,484,847

UNITED STATES PATENT OFFICE 2,484,847

PRESSURE CONTROLLING APPARATUS

Win W. Paget, Michigan City, Ind., assignor to Joy Manufacturing Company, a corporation of Pennsylvania Application July 30, 1942, Serial No. 452,925

35 Claims. (Cl. 98—1.5)

My invention relates to pressure control devices, and more particularly to automatic pressure control devices especially designed for regulating pressure conditions in pressurized cabins of aircraft.

It is necessary for high altitude flight that the cabins of planes be pressurized. This involves the provision of means for the introduction of air from the exterior of the cabin and means for the discharge of excess air from within the cabin. The pressure in the cabin may ordinarily be allowed to follow freely the variations in external pressure until the plane reaches a predetermined height, for example 8,000 feet. Thereafter, it is preferable that until a considerably greater height is reached, say 35,000 feet, the pressure in the cabin be maintained relatively constant at approximately the pressure which corresponds to 8,000 feet, or whatever other value is selected. However, if the plane has occasion to go above the upper limit mentioned, it is desirable that there shall be a variation in the cabin pressure with the changes in altitude, so that the cabin pressure may again be reduced as the external pressure becomes lower. For some purposes it is desirable that above this higher predetermined height the cabin pressure shall be reduced as elevation increases in such a manner that there shall be maintained a constant difference in pressure between cabin and external pressure. For other purposes it is desirable that a constant ratio be maintained between cabin pressure and external pressure as altitudes above the predetermined limit mentioned are reached. Whichever system of control is utilized, it is important that these reductions in pressure shall take place automatically, both because thereby the danger of damage to the cabin, through excessive pressure differentials between the inside and outside thereof, is reduced, and also thereby it is possible to relieve the load on the pressurizing device which has to elevate the pressure of the very rarefied atmosphere to cabin pressure and which must work very hard at such extreme heights unless the cabin pressure can be further reduced. It is furthermore important that devices of this character shall be simple in construction, that they shall be compact and positive in operation, and that they shall have provision for the freeing of their parts from ice which may form upon them in use.

An object of the present invention is to provide an improved automatic pressure control device. It is another object of my invention to provide an improved automatic pressure control device having improved means for rendering it subject successively to different controls. It is a further object of my invention to provide an improved automatic pressure control device having a single operating mechanism governed by the differential between the pressures inside and outside thereof and having improved separate control devices therefor governing the pressure within the cabin under certain external conditions. A further object of the invention is to provide an improved automatic pressure control device having an improved arrangement of pressure-responsive pilot devices. It is still another object of the invention to provide an improved automatic pressure control device especially adapted for the control of cabin pressure in airplanes. Yet a further object of the invention is to provide an improved automatic pressure control device automatically operative to maintain uniformity of pressure conditions under certain external pressures and a changing set of pressure conditions under other external pressures. Yet another object of the invention is to provide an improved automatic pressure control device automatically operative to maintain substantially uniform cabin pressure conditions during flight at certain altitudes and cabin pressure conditions varying as altitude varies above a predetermined higher altitude. Another object is to provide an improved automatic pressure control device operative to permit cabin pressures to vary substantially directly with external pressures up to a predetermined altitude and then during certain further increases in altitude to maintain cabin pressure substantially constant, and, when a still higher altitude is reached, to provide for the maintenance of a cabin pressure which shall bear a relatively constant ratio to the external pressure. Still another object is to provide an improved pressure-responsive valve device for controlling communication between the interior of the cabin and atmosphere, said valve mechanism having improved means operative automatically to vary the communication so that cabin pressures are maintained substantially constant during flight at certain altitudes, and so that cabin pressures vary directly with external pressures during flight at higher altitudes. A further object of the invention is to provide an improved cabin vent valve mechanism having improved de-icing means associated therewith. It is a still further object to provide an improved cabin vent valve mechanism having improved close-adjusting and de-icing means associated therewith. It is yet a further object to provide an improved cabin vent valve mechanism having improved automatic and manual adjusting means associated therewith. Other objects and advantages of the invention will appear from the following description and from the appended claims.

In the accompanying drawings, in which I have shown two embodiments which my invention may assume in practice.

Referring first to the preferred embodiment illustrated in Figs. 1 to 9, inclusive, it will be observed that the device as a whole is designated 1, and that it comprises a casing 2, a vent valve 3, an expansible-chamber-control device 4, herein shown as a bellows, a primary pilot control device $p^1$ adapted to commence to function when the plane reaches an altitude above which a free drop in the cabin pressure may not desirably be continued, and a secondary pilot mechanism $p^2$ adapted to function when a relatively high altitude is attained and to maintain, in this preferred embodiment of the invention, a constant ratio between the pressure within the cabin and the external pressure.

Figure 1:
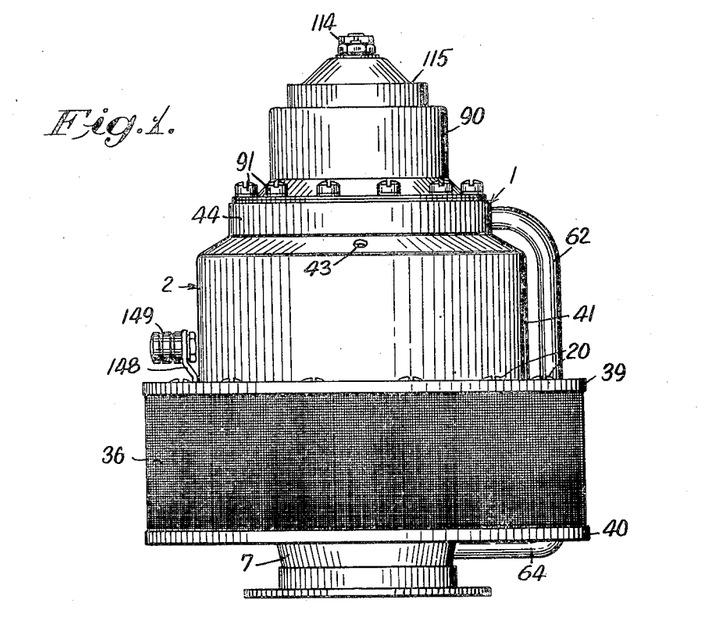
Fig. 1 is a side elevational view of a preferred form of the pressure control device, the same being shown detached from its support.
Figure 2:
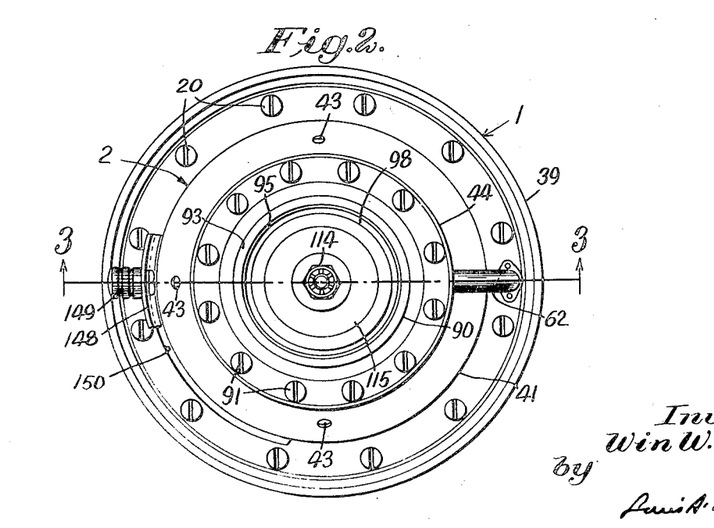
Fig. 2 is a plan view of the device shown in Fig. 1.
Figure 3:
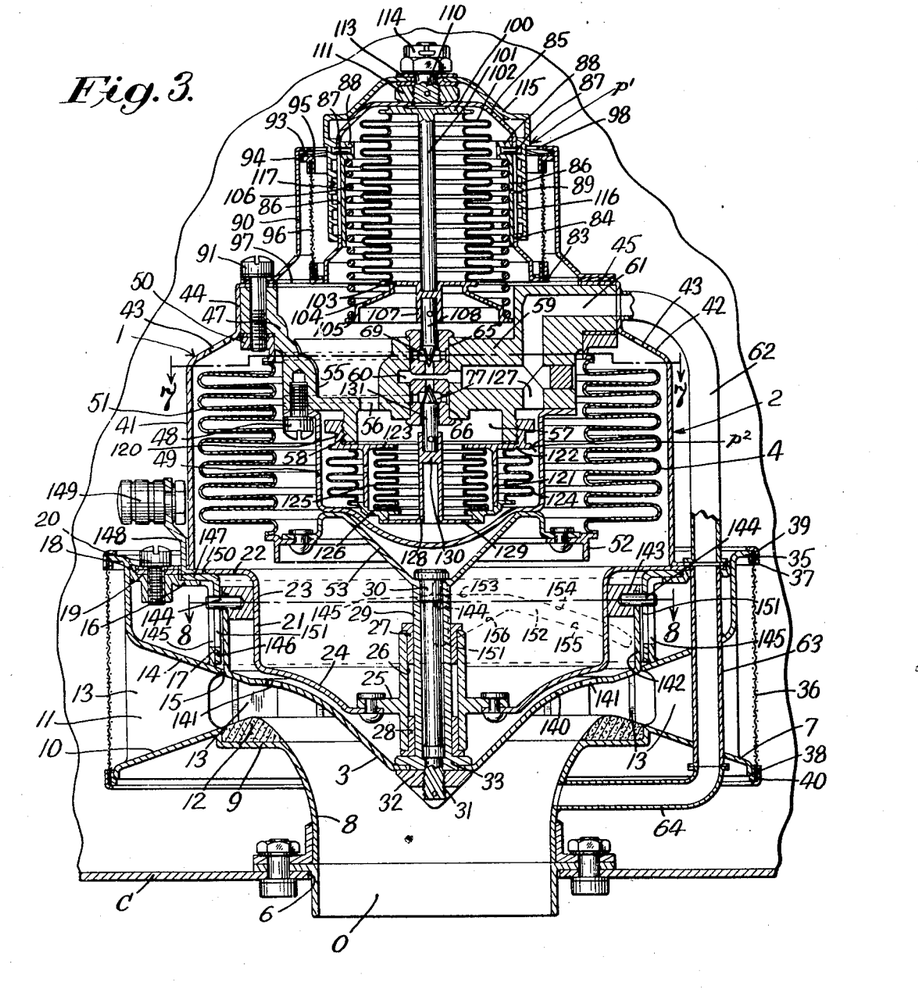
Fig. 3 is an enlarged central vertical section through the device of Figs. 1 and 2, showing the same attached to its support and with the vent valve which forms a part thereof in full open position.
Figure 4:
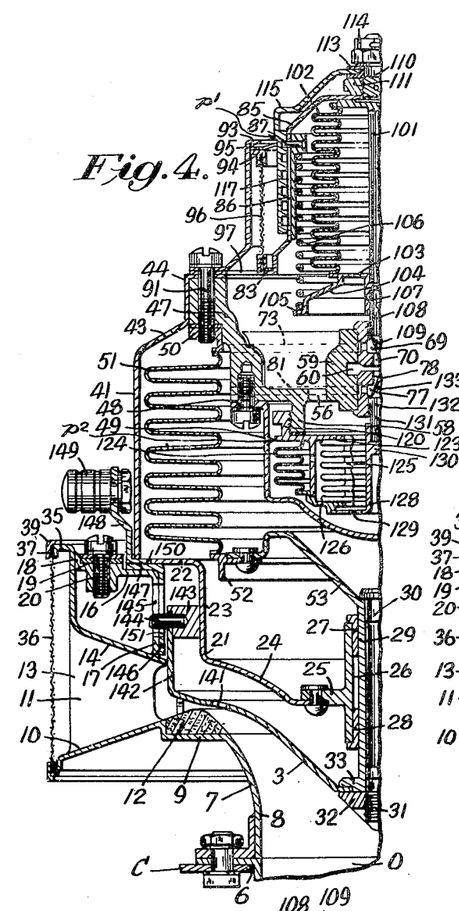
Fig. 4 is a fragmentary sectional view similar to Fig. 3, showing the vent valve in nearly closed position with the control still wholly exerted by the pilot control device which first assumes charge of the operation.
Figure 5:
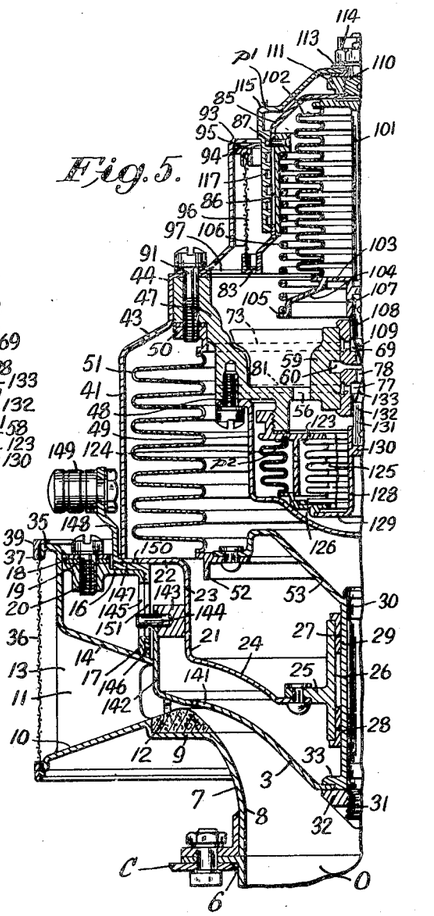
Fig. 5 is a sectional view similar to Fig. 4, showing the vent valve also in nearly closed position, but with the control taken over by the other pilot control device.
Figure 6:
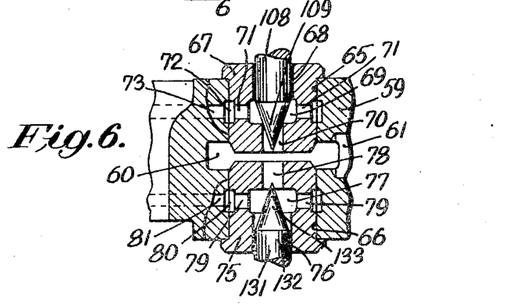
Fig. 6 is a detail vertical sectional view on a plane corresponding to that of Figs. 3, 4 and 5, showing the pilot valve device on a still larger scale.
Figure 7:
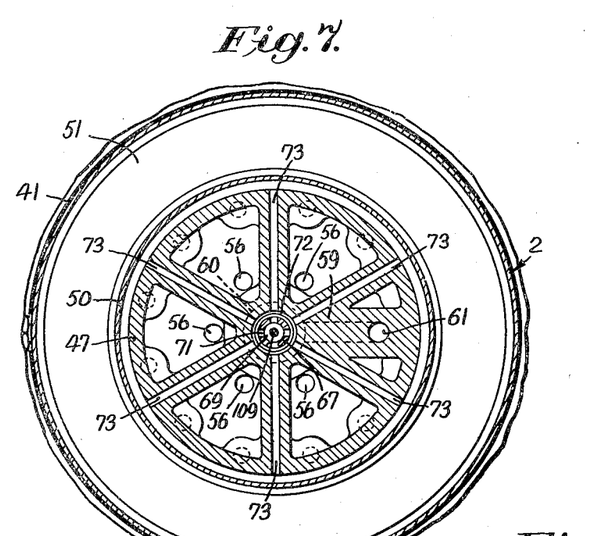
Fig. 7 is a horizontal section on the plane of the line 7—7 of Fig. 3.

The stationary casing 2 is mounted over an opening 6 in a wall of a cabin, the pressure within which is to be controlled. A portion of the wall of such cabin is illustrated at C. The casing 2 includes a lower annular portion 7 which is made of a tapering-discharge-orifice-providing portion 8 which projects within the opening 6 and through which the vent port 0 opens. The portion 8 is surrounded by an annular valve-seat-supporting surface 9, and an outer frusto-conical portion 10 which forms the lower boundary for a generally annular passage 11 communicating with the interior of the cabin. A suitable valve seat element 12 of fiber, or similar material, is mounted on the seat supporting surface 9. Supported by suitable webs 13 on the portion 10 is an upper annular wall 14 surrounding at its lower end, a circular opening 15. A member 16, comprising an approximately cylindrical annular portion 17 and an approximately radial flange portion 18, is welded to the annular wall 14 respectively near the opening 15 and near the uppermost part of the wall member 14. The radial flange portion 18 provides a seating surface 19. The member 16 also has bosses for receiving bolts 20 for holding the parts in assembled position. Supported on the seating surface 19 is a casing member 21 comprising a flange 22 resting on the surface 19, a cylindrical wall 23 coaxial with the discharge orifice 0, and finally a tapering, downwardly projecting, wall portion 24 connected to a guide supporting element 25 having a bore 26 in which upper and lower sleeves 27 and 28 are mounted and serve to guide a tubular stem 29 to which the valve 3 is attached. A suitable bolt 30 extends through the sleeve 29 and has its head engaging the lower end of the bellows device 4 to clamp said end against the sleeve 29, and has a lower threaded extremity 31 engaged by a nut 32 which clamps the central portion of the valve 3 against an enlarged head 33 on the sleeve 29. The extreme upper end of the upper annular wall 14 is provided with an outwardly flared flange portion 35 which coacts with the wall portion 10 to bound the annular opening through which fluid enters the valve casing from the interior of the cabin. A suitable screen 36 engages cylindrical portions 37 and 38 at the outer edges of the flange portions 35 and 10 to prevent the access of material which might damage the valve mechanism, to its interior. Any suitable holding rings, such as 39 and 40, may be used to maintain the screen in place. Also supported by the seating surface 19, but resting on the flange 22, is a top casing member 41 tapering inwardly, as at 42, at its upper end and having perforations 43 therethrough so that the cabin pressure may attain freely to the interior of the member 41. The upper end of the member 41 includes an annular portion 44 of reduced diameter and an inwardly directed annular portion 45 upon which there is seated, in a manner later described, the primary control device $p^1$. Within the annular portion 44 is a block member 47, and fixed to the lower end of the block 47, as by holding screws 48, is a downwardly projecting stop and closure member 49. Fixed, as later described, to a lower surface of the block member 47 is a ring 50, and brazed, or otherwise suitably fastened, to the ring 50 is a diaphragm or expansible-chamber bellows 51 surrounding the member 49. The opposite end of the bellows 51 is connected to a ring member 52 which has secured thereto a conical element 53 forming the bottom element of the bellows device 4 which is clamped by the bolt 30, previously described, to the sleeve 28. The block 47 is cored out, as at 55, and has passages 56 extending from the cored-out portion 55 into a circular chamber 57 lying to the inside of a depending threaded flange 58 carried by the block 47. The block 47 has a central portion 59 within which a space 60 is formed, and this space is connected by passages 61 in the block and by tube elements 62, 63 and 64 to the discharge orifice 0 whereby the space 60 is at all times connected to external pressure. Communicating with the space 60 are bushing-receiving bores 65 and 66. The bore 65 contains what may be termed a bushing member 67 traversed axially by a relatively large bore 68 opening into a chamber 69 and a smaller passage 70 opening from the chamber 69 into the space 60. The chamber 69 is connected by radial passages 71 with an annular groove 72 which is connected by radial passages 73 (Figs. 6 and 7) with the interior of the bellows device 4. Another bushing member 75, generally similar to the member 67, is traversed upwardly from its lower end by a relatively large bore 76 leading into a central chamber 77 from which a smaller bore 78 (Fig. 6) opens into the space 60. Radial passages 79 open from the chamber 77 into an annular groove 80 which is connected by radial passages 81 with the interior of the bellows device 4, i. e. the interior of the collapsible bellows 51.

Mounted on the flange 45 is a perforated radial flange 83 which supports a circumferential wall 84 whose top is provided with an integral closure cap portion 85. The wall 84 has longitudinal slots 86 slidably receiving pins 87 mounted in bosses 88 on a sleeve portion 89 which is vertically slidable within the wall portion 84. Another radially flanged connecting member 90 seats upon the top of the flange portion 83, and the member 90 is clamped with the radial flanges 83 and 45 to the block 47 and the ring 50 by suitable holding screws 91. The member 90, at is upper end, has an inwardly directed annular flange 93 between which and an annular member 94, L-shaped in cross section, an annularly flexed spring 95 acts to maintain a suitable screen 96 in position with its lower end disposed just inside openings 97 in the flange member 83. There is an annular opening 98 just inwardly of the flange portion 93, and the space within the interior of the cabin communicates, through the opening 98 and the screen 96, with the space within the block 47 and through the passage 56 with the chamber 57. The cap member 85 supports, at its lower side, a head 100 of a stop stem 101. Surrounding the stop stem and brazed, or otherwise suitably held, to the head 100 is an evacuated bellows 102 whose lower end is attached to a plate 103 having an outwardly extending wall portion 104 providing a shoulder 105 against which a spring 106 engages at its lower end. The upper end of this spring engages the bosses 88, previously mentioned. Centrally of the plate 103 is a socket-providing portion 107 in which there is secured a valve member 108 fitting loosely within the bore 68 and having a tapered end 109 adapted to close the opening 70. At the upper end of the stop stem 101 is a threaded portion 110 extending upwardly through an opening in the cap portion 85, and threaded on the portion 110 is a nut 111 for clamping the head 100 against the cap portion 85. Washer or sleeve members 113 are mounted on the portion 110 and held by lock nut means 114 against the upper end of the nut 111, and rotatably mounted between the members 113 is an adjusting member 115 having a portion 116 extending through the annular space 98 and internally threaded, as at 117, and coacting with the ends of the pins 87. It will be evident that by rotating the member 115, the pins, which are prevented from rotation about the axis of the stop stem 101 by the slots 86, will be caused to move up or down in these slots and move the bosses 88 to relieve or increase the compression of the spring 106.

Threaded upon the flange 58 of the block 47 is a member 120, somewhat T-shaped in radial cross section, this member including a cylindrical stop portion 121, an outer flange portion 122 and an inner flange portion 123. Suitable bellows devices 124 and 125 are brazed, or otherwise held, at their upper ends to the flanges 122 and 123 and, at their lower ends, are secured to an annular member 126. The space between these bellows is evacuated. The space surrounding the bellows 124 is connected by a passage 127 in the block 47 into communication with the passage 61. A member 128 having a head 129 is secured to the annular member 126, and a central portion 130 on the member 128 supports a valve 131 comprising a cylindrical portion 132 and a tapered end portion 133. The tapered portion coacts with the port 78 while the portion 132 fits loosely within the bore 76.

Figures 8, 9:
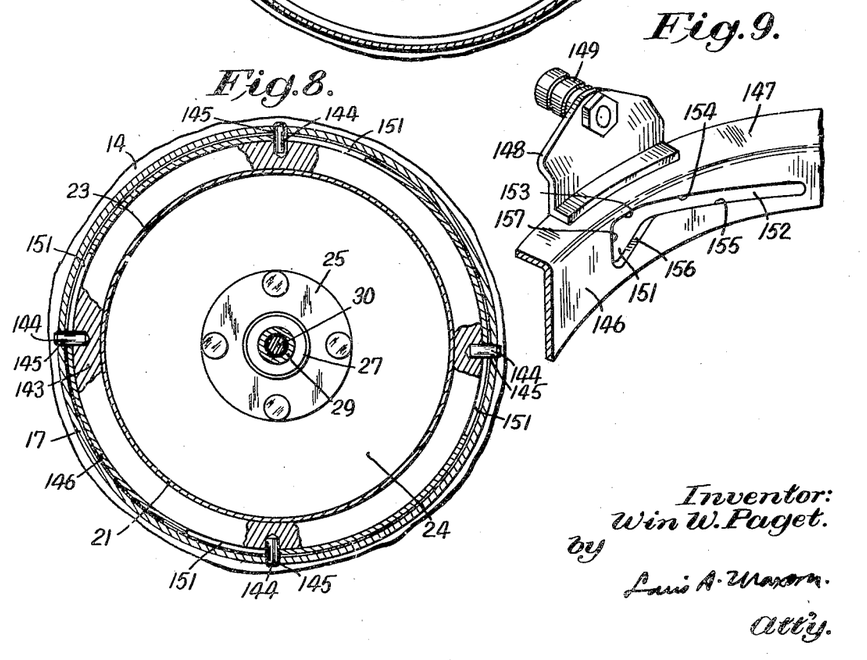
Fig. 8 is a horizontal sectional view on the plane corresponding to the line 8—8 of Fig. 3, parts being broken away to show details of construction.
Fig. 9 is a fragmentary perspective view showing a portion of the de-icing mechanism.
Figure 10:
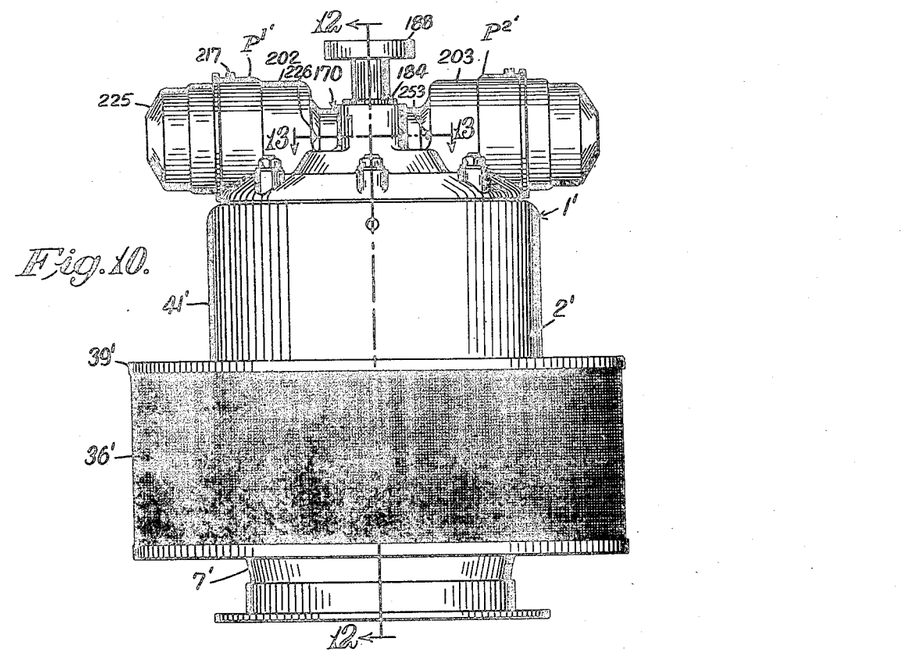
Fig. 10 is a side elevational view of a modified embodiment of the invention, the same being shown detached from its support.
Figure 11:
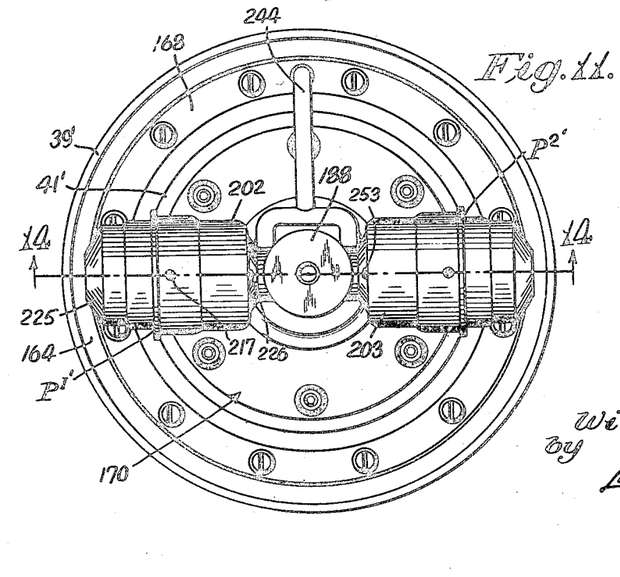
Fig. 11 is a plan view of the device shown in Fig. 10.
Figure 12:
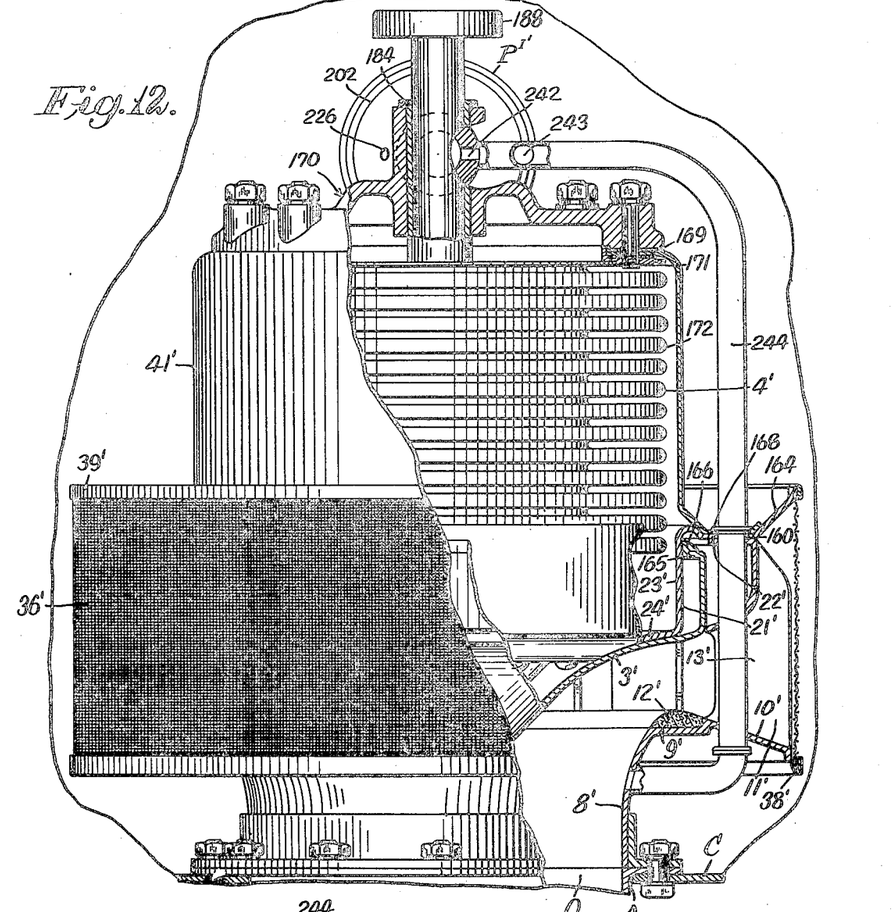
Fig. 12 is an enlarged view partially in elevation and partially in central vertical section with parts broken away on the plane of the line 12—12 of Fig. 10, showing the device attached to its support.
Figure 13:
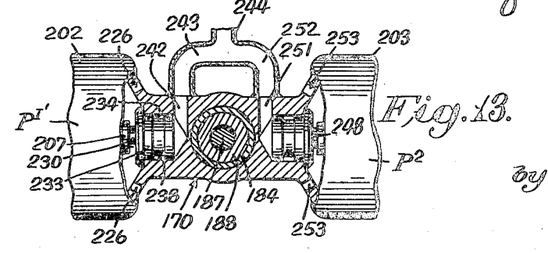
Fig. 13 is a fragmentary horizontal sectional view on the plane of the line 13—13 of Fig. 10, showing details of the pilot valve mechanism on an enlarged scale.

The valve 3 includes a relatively conical portion 140 perforated, as at 141, so that the pressures may be similar on opposite sides thereof and has, at its outer edge, a cylindrical sleevelike portion 142 to which there is secured a ring 143 guided on the outer wall of the cylindrical portion 23. Projecting outwardly from the cylindrical portion 142 are pins 144 extending through vertical slots 145 in the annular cylindrical wall 17. Between the wall 142 and the wall 17 there is rotatably mounted a cylindrical member 146 having a radial flange 147 to which there is welded an upstanding operating flanged portion 148 carrying a button or finger piece 149. The portion 148 moves in an arcuate slot 150 in the flange 22. The cylindrical member 146 is traversed, as shown in Figs. 3 and 9, by a series of openings each including a relatively right triangular portion 151 and a communicating helically extending elongated portion 152. The top wall 153 of the portion 151 lies in a plane perpendicular to the axis of the mechanism. The top and bottom walls 154 and 155 of the helically extending portion 152 extend obliquely downward. The lower wall of the portion 151 is relatively sharply upwardly inclined, as at 156. The end wall of portion 151 is vertical, as at 157. Now it will be evident that by turning the annulus 146 counterclockwise, in terms of directions looking down upon the valve device in Fig. 3, and causing the helically disposed portions 152 to engage the pins 144, the valve 3 may be adjusted to and held in substantially any desired position. It will further be observed that when the annulus 146 is left in the position indicated in Fig. 3, the valve may move freely up and down without interference from this annulus. It will also be evident that when the valve is nearly closed or quite closed, if the same becomes stuck by ice or the like, the surface 156 may be caused to wedge up the valve and because of its steepness can be used to cause the valve to reciprocate rapidly and thus to free it from ice.

The mode of operation of the preferred embodiment of the invention thus far described is as follows. The position of the valve 3 with respect to its seat 12 depends upon the pressures respectively inside the bellows device 4 and outside of it. The pressure inside the bellows device 4 is variable and is controlled by the valves 108 and 131 regulating the connection of the interior of the device through the passages 73 and 81 respectively with the passage 61 leading through the tubes 62, 63 and 64 to the vent port 0. The pressure surrounding the bellows device is also variable, as the cabin pressure is not maintained constant and the space surrounding the bellows is in free communication through the perforations 43 with the interior of the cabin. The positions of the valves 108 and 131 are governed by the pressures acting upon the bellows 102 and the bellows device 124, 125.

The valve 108 is designed to control the movements of the vent valve 3 between altitudes of approximately 8,000 feet and 35,000 feet. The bellows device 124, 125, or perhaps better put, the composite bellows 124, 125, are adapted to control the vent valve at levels above approximately 35,000 feet.

As previously noted, the bellows 102 is an evacuated bellows, and its exterior is continuously subjected to the pressure conditions prevailing within the cabin of the airplane through the orifices in the screen 96 and the annular opening 98. The bellows 102 normally assumes a relatively collapsed position, with the plate 103 against the stop 101 and with the valve 108 off its seat, and the adjustment of the spring 106 determines when the valve 108 will be seated. Normally, the spring 106 is adjusted so that when cabin pressure drops to a value corresponding to the external pressure at a height of approximately 8,000 feet, the spring will be able to overcome the force exerted by the cabin pressure on the evacuated bellows. With the understanding that the valve 108 is unseated at ground level and at elevations up to about 8,000 feet, it will be appreciated that the interior of the bellows device 4 is connected to the exterior of the cabin continuously until the height of approximately 8,000 feet is reached. As a result, the vent valve 3 will remain open until the altitude is reached at which the valve 108 will be closed. When that altitude is attained, the spring 106 moves the head 103 to close the valve 108, with the result that the communication of the interior of the bellows device 4 with the exterior of the plane will be interrupted, and cabin pressure will pass through the restricted annular opening along the outside of the valve 108 into the chamber 69 and through the passages 73 into the interior of the bellows device 4, and cause a closing movement of the vent valve 3. As the vent valve closes, the cabin pressure will tend to increase, and the instant it reaches a pressure sufficient to enable the evacuated bellows 102 to overcome the force exerted by the spring 106, the valve 108 will reopen, resulting in a reduction in the pressure inside the bellows device 4 and a partial reopening of the vent valve 3. Accordingly, whether by successive openings and closings of the valve 108 or by mere variation in position of that valve, there will be attained such a control of the pressure within the bellows device 4 that the cabin pressure will be held in close proximity to the value which corresponds to the altitude of 8,000 feet so long as the plane remains above 8,000 feet and below an altitude at which the bellows device 124, 125 operates the associated valve 131.

As previously noted, the space between the bellows 124 and 125 is evacuated, and accordingly these bellows will remain collapsed, with the annular member 126—to which their lower ends are connected (see Fig. 3)—held against the stop 121 until other pressures sufficient to extend these bellows and thereby unseat the valve 131, exist. The space to the inside of the bellows 125 is subject to cabin pressure. Thus cabin pressure exerts on the head 129 a pressure tending to unseat the valve 131. The space outside the bellows 124 and at the lower side of the head 129 is continuously subjected to the pressure outside the cabin. This area will be noted to be considerably larger than the area subjected continuously to cabin pressure. We thus have an arrangement such that the cabin pressure will bear the same ratio to outside pressure as exists between the area exposed to outside pressure and the area exposed to cabin pressure; and until outside pressure falls below a value corresponding to say 35,000 feet altitude, the valve 131 will remain closed continuously. The cabin pressure, as has been noted, is to be kept by the action of the valve device 108 at a value corresponding to outside pressure at 8,000 feet, to wit, about 22.22 inches of mercury. The pressure at 35,000 feet is about 7.04 inches of mercury. Thus, if the area exposed to outside pressure is about $$\frac{22.22}{7.04}$$

times the area exposed to cabin pressure the valve 131 will remain closed until an altitude of 35,000 feet is attained, and will open when the plane goes higher and cause a reduction in cabin pressure so that at altitudes above 35,000 feet the cabin pressure will be maintained at a value $$\frac{22.22}{7.04}$$

times outside pressure, it being evident that when valve 131 unseats the vent valve 3 tends to be opened by reason of the reduction in pressure within the bellows 51, and that the resultant reduction in cabin pressure acting on the upper side of the head 129 then permits closing movement of the valve 131, so that the desired substantially constant ratio between internal (cabin) pressure and outside pressure is maintained at altitudes above 35,000 feet. It will of course be evident that valve 108 will remain closed so long as the operation of the valve 131 keeps cabin pressure below the value corresponding to 8,000 feet. Thus the device as a whole so far described is effective automatically to permit cabin pressure to follow outside pressure at elevations below 8,000 feet, to cause cabin pressure to be maintained constant at a value equivalent to the external pressure at 8,000 feet, between that height at 35,000 feet, and to cause cabin pressure to fall and increase as the airplane rises and descends at altitudes above 35,000 feet, and to maintain a constant ratio between cabin and outside pressures during flight above 35,000 feet.

It will further be evident that if ice tends to form on the valve 3 or on its seat, or otherwise to interfere with the operation of the device, the finger piece 149 may be moved circumferentially of the device and cause the valve to be moved rapidly in such a manner as to break off the ice. When the pins are raised along the surfaces 156 a rapid lift may be effected, and lowering by the action of the bellows 51 can be had by moving the finger piece 149 back to the position shown. When the finger piece is moved further and the slots 152 move over the pins a positive reciprocation of the valve 3 may be caused.

Referring now to the other illustrative embodiment of the invention, it will be noted that the valve device as a whole is designated 1' and that it comprises a composite casing generally designated 2' in which a balanced valve element 3' is reciprocable, and that a primary, expansible chamber, operating device, herein in the form of a bellows, is shown at 4', while primary and secondary control pilot mechanisms $P^{1'}$ and $P^{2'}$ are included for the purpose of controlling the flow of fluid relative to the interior of the operating device 4'. The stationary casing is mounted over an opening A in the wall C of a cabin the pressure within which is to be controlled. The casing 2' includes a lower annular portion 7' which is made up of a tapering discharge-orifice-providing portion 8' which projects within the opening A and through which the discharge orifice 0 opens The portion 8' is surrounded by an annular valve seat supporting portion 9' and an outer frusto-conical portion 10' which forms a lower boundary for a generally annular passage 11' communicating with the interior of the cabin. A suitable valve seat element 12' of fiber or similar material is mounted on the seat support 9'. Supported by suitable webs 13' on the portion 10' is an upper annular wall 14' surrounding at its lower end a circular opening 15', and at its own upper end providing an annular seating surface 160. Supported on the seating surface 160 is a casing member 21' comprising a flange 22' resting on the seating surface 160, a cylindrical wall portion 23' coaxial with the discharge orifice 0, and finally a tapering, downwardly projecting wall portion 24' to which a frusto-conical element 161 is secured as at 162; and the lower end of the wall portion 24' and the upper end of the frusto-conical element 161 serve to center and provide a mounting for a tubular guide sleeve 163. A suitable strainer 36' is supported at the lower outer edge of the wall portion 10' by suitable holding means 38', and is supported by holding means 39' at the upper outer edge of an outwardly projecting portion 164 of the member 21'. The valve element 3' is provided with a cylindrical wall portion 142', which is a comparatively close fit for the opening 15' and has a rebent portion 165 carrying a sealing element 166 which slidably engages the cylindrical wall portion 23' upon the outer periphery of the latter. Carried by the supporting surface 160 but resting upon the top of the element 21' is an annular supporting portion 168 which supports the cylindrical outer wall portion 41' of the casing 2'. The top of the casing 2' is provided with a radially inwardly directed flange 169 which supports a housing structure generally designated 170. To the lower side of the flange 169 is brazed or otherwise suitably held a top support element 171 to which there is secured a bellows member 172 whose lower end is attached through an annular attachment member 173 to a conical member 174. The member 174 is secured between a shoulder 175 on a vertical hollow valve-operating stem 176 and a guide rod support member 177. The lower end of the stem 176 carries the vent valve 3', the vent valve being secured between a shoulder 179 on the stem 176 and a nut 180 threadedly secured to the lower end of the stem. The support 177 carries a plurality of guide rods 182 (herein four) projecting upwardly within the interior of the bellows member 172. These are received in and guided by bores 183 in a tubular element 184 which is carried by the housing 170 and extends through a central bore 185 in the housing. The lower end of the member 184 is closed except for a relatively small opening 186 through which a rod 187, threadedly supported in a manually operable plunger member 188, extends. The lower end of the rod 187 extends through a packing 189 which is adapted to be maintained under compression by a spring 190 and a follower 191.

Figures 16, 17, 18:
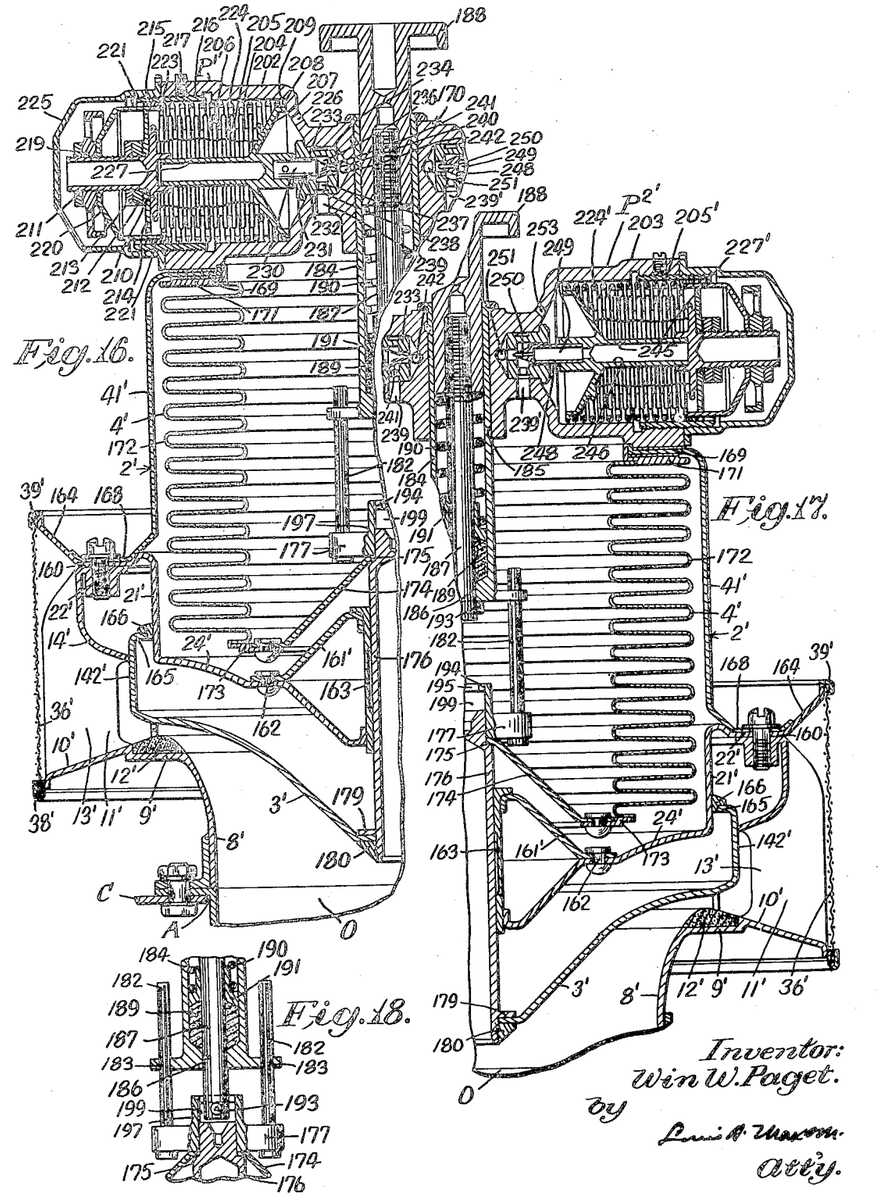
Fig. 16 is a view corresponding to the left hand side of Fig. 14, showing the main control valve in nearly closed position, and with the parts in a position corresponding to control exclusively by the first pilot mechanism which governs operation.
Fig. 17 is a view corresponding to the right hand side of Fig. 14, showing the parts in a position corresponding to control by the pilot valve mechanism of the right hand side of Fig. 14.
Fig. 18 is a fragmentary sectional view showing the parts positioned for the de-icing operation.

At almost the extreme lower end of the rod 187 there is a cross key element 193 which is adapted to enter suitable slots 194 which open into a central bore 195 in a partial closure member 196 mounted in an upwardly projecting portion 197 of the member 177. Between the partial closure member 196 and the top of the stem 176, a chamber 199 is provided, the length of which is sufficient to receive the bottom portion of the rod 187 and the cross key 193. It will be observed that by rotating the head 188 to bring the cross key 193 into alinement with the openings 194 the cross key can be passed through into the chamber 199 and then again rotated through a suitable angle, for example 90°, and thus the rod 187 may be locked to the stem 176. Then by shoving the head 188 downwardly and either pulling it up or allowing the spring 190 to move it upwardly it will be possible to free the valve 3' from any ice which may tend to form upon it.

The function of the pilot device $P^{1'}$ is to control the pressure conditions within the cabin between some such height as 8,000 feet and some higher height, such as 35,000 feet. Up to 8,000 feet, as previously explained, the cabin pressure may be allowed to follow the external pressure closely without serious discomfort to the cabin occupants —at least except during periods of very rapid rise of the "plane." Above the selected level, such as 8,000 feet, it is desired to maintain the cabin pressure substantially constant, regardless of the height of flight, until at extreme altitudes further variations in cabin pressure controlled by the pilot mechanism $P^{2'}$ become desirable.

Figures 14, 15:
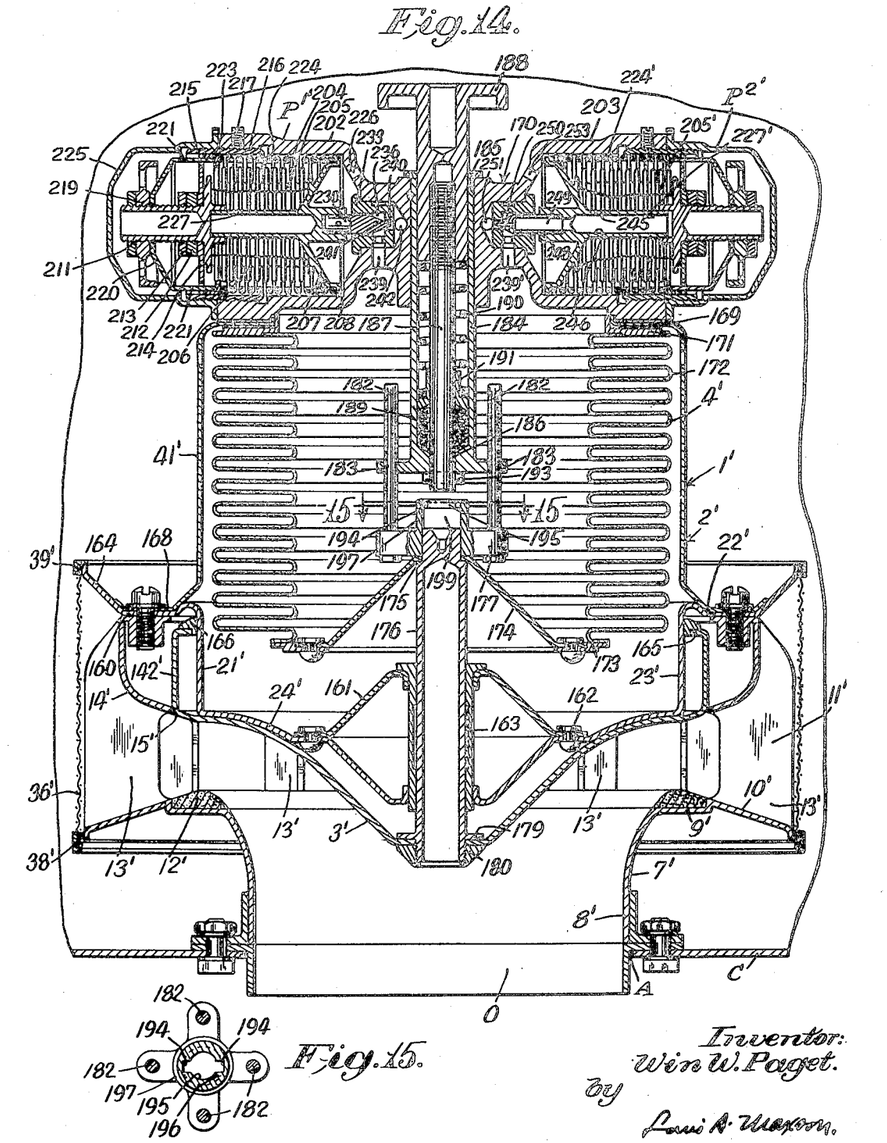
Fig. 14 is a vertical sectional view on an enlarged scale on the plane of the line 14—14 of Fig. 11.
Fig. 15 is a horizontal sectional view on the plane of the line 15—15 of Fig. 14.

It will be observed that the housing structure 170 is in the form of a plate which acts as a closure for the top end of the bellows device 172, and that from its upper surface there project bosses 202 and 203 which form housings for the pilot mechanisms $P^{1'}$ and $P^{2'}$ respectively. The boss 202 is hollow and contains a chamber 204 in which an evacuated bellows device 205 is mounted. This device includes a bellows proper 206, a closure member 207 at the radially inner end of the bellows, which closure member in the expanded condition of the bellows is adapted to engage, through an annular flange portion 208, a shoulder 209 near the radially inner end of the chamber 204, and a radially outer head or closure member 210, the bellows member 206 being suitably secured to the head members 207 and 210. The head 210 has a threaded radially outwardly extending projection 211, and holding and lock nuts 212, 213 clamp the head 210 to a radially extending slotted support web 214 which is formed integrally with a threaded sleeve 215 threadedly engaged in an enlarged threaded portion 216 of the bore 204. A set screw 217 is adapted to maintain any desired adjustment of the threaded sleeve 215. It will be evident that by varying the position of the sleeve 215 the bellows device may be moved bodily lengthwise within the chamber 204. Nearer the end of the projection 211 is threadedly mounted a handnut 219, which engages and is adapted to adjust a member 220, having fingers 221 extending through slots in the web 214 and engaging an annular spring follower 223. A spring 224 acts between the follower 223 and the flange 208 on the head 207 of the bellows device. It will be evident that by adjustment of the member 220 along the projection 211 the compression of the spring 224 may be varied, and thereby the critical amount of reduction in pressure which will be effective to permit an expansion of the bellows device 205 will be varied. A protective cap 225 is threadedly engaged with the portion of the threaded sleeve 215.

The interior of the chamber 204 outside the bellows device is subjected to cabin pressure through a plurality of openings 226, and it will be understood that the pressure from the cabin admitted through the openings 226 acts upon the exterior of the bellows device 205 and tends to maintain the same collapsed. When the cabin pressure is sufficiently reduced, the spring 224 will be enabled slightly to expand the bellows. The head 207 of the bellows device carries a stop stem 227 which limits the possible collapse of the bellows by engagement with the head plate 210. There is also carried by the head 207 a mounting for a valve 230, this valve having a cylindrical portion 231 which fits, with a certain amount of clearance, a bore 232 in a valve seat member 233 received in another bore 234 in the head member 170. The member 233 has a central chamber 236 which communicates through radial openings 237 with a peripheral groove 238, and this groove is connected by a passage 239 with the interior of the bellows device 4'. A smaller passage 240 opens through the end of the member 233, and the valve 230 has a conical portion 241 which is adapted in certain positions to close the passage 240. The bottom of the bore 234, with which the passage 240 communicates, is connected by a suitable passage 242 with a branched conduit 243, which is connected by a passage device 244 with the space outside the valve seat 12', so that external pressure may continuously exist in the passage 242.

The operation of this pilot mechanism may be now described. The valve 230 is held by the cabin pressure in an unseated position until the predetermined height at which the device is adapted to come into effect is attained. Under such conditions the valve portion 241 will be retracted from the port 240. The pressure within the bellows device 4' will be free to pass through the passage 239, groove 238, passages 237, chamber 236, passage 240 and passages 242, 243 and 244; and accordingly the cabin pressure will tend to maintain the valve 3' in open position. Accordingly, the cabin pressure will follow closely the external pressure. When the plane gets above the 8,000-foot level the pressure in the cabin will have fallen sufficiently to allow the spring 234 to expand the bellows device 205 and seat the valve portion 241. As a result the leakage of cabin pressure into the interior of the bellows member 172 along the stem of the valve will build up the pressure within the bellows device 4' and as this pressure will be higher than external pressure, it will cause a partial closure of the valve 3' to occur. When the vent valve moves in a closing direction, the cabin pressure will tend to build up to a sufficient value to recompress the spring 224, and then the valve portion 241 will reopen and vent some of the cabin pressure which has leaked in, around the valve 230, into the chamber within the bellows 172 (4') into the surrounding air, with the result that the bellows will again partially open the valve 3'. The net result of these movements will be a causing of the valve 3' progressively to close as the plane rises higher and thereby increases the differential between cabin pressure and external pressure, the cabin pressure being maintained at approximately a uniform value until another variable factor is introduced by the pilot device P2' when the plane reaches an elevation of perhaps 35,000 feet.

The pilot mechanism P2' is, as previously explained, located in the boss 203. The structure of this mechanism and of its adjusting devices follows very closely the structure of the device P1', but instead of employing an evacuated bellows 205, there is present a bellows 205' whose interior is adapted to be connected through a port 245 with a bore 246 in the stop member 227'. A valve 248 is carried by the stop member 227' and is hollow, as at 249, and its interior is connected through a small port 250 with a passage 251 leading to the conduit 244. It will be understood that this pilot mechanism includes a connection 239', corresponding to the connection 239, with the interior of the bellows member 172, and also includes a connection 252 corresponding to the connection 243 with the conduit 244. It will be understood with respect to this device P2' that the spring 224' will normally maintain the valve 248 seated, and thus prevent any connection through the passage 239' between the interior of the bellows 172 and the surrounding air. However, the interior of the bellows 205' will be continuously subjected to external conditions, and when a height of 35,000 feet, say, is attained, the reduction in pressure inside this bellows will be such that the pressure within the cabin which acts on the exterior of the bellows through one or more ports 253 will be sufficient to overcome the pressure exerted by the spring 224'. Under such circumstances, the valve 248 will be unseated, and will allow the pressure within the interior of the bellows 172 to vent to atmosphere through the passages 239', 251, 252, 244, etc. This will result in a slight opening of the valve 3' from the position in which it had previously been held by virtue of the operation of the controlling device P1'. As soon as the valve 3' opens somewhat, there will be a reduction at a rapid rate in the cabin pressure, and accordingly the pressure acting upon the bellows 205' will be reduced and this bellows will then be re-expanded by the spring 224', seating the valve 248. Air leaking along the outside of the stem of the valve 248 and through the passage 239', no longer being free to escape to the outside, will increase the pressure within the bellows 172, with the result that the valve 3' will be partially returned towards closed position. The changes in altitude and the changes in cabin pressure resulting from the movements of the valve 3' will operate to control the valve 3' in such a manner that there will be maintained an approximately constant differential in pressure between the interior of the cabin and the exterior thereof, instead of a constant ratio between internal and external pressures being maintained, as in the case of the apparatus of the preferred embodiment.

The mode of operation of the invention as a whole will be clear from what has been said. In each device the pressure within the cabin is adapted to follow outside pressure closely until some predetermined height, such as 8,000 feet, is reached. In each device there is provided a pilot mechanism including an evacuated bellows which expands when the predetermined height mentioned is attained, to close a valve which has previously permitted a connection of the interior of the bellows which operates the cabin vent valve with the outside air; and when this pilot valve is closed air from the cabin enters the bellows which controls the cabin vent valve and results in a closure of the latter. This mechanism operates to maintain approximately constant cabin pressure, in each embodiment of the invention, until some relatively considerable altitude, like 35,000 feet, is reached. It will be noted that both of the pilot mechanisms which govern cabin pressure between the elevations of 8,000 and 35,000 feet are provided with adjustments which will permit of substantial variation in the lower one of the critical heights mentioned.

After a height of 35,000 feet approximately is reached, in each of the embodiments of the invention, another pilot device takes over control. In the preferred embodiment this pilot mechanism operates to maintain a constant differential in pressure between cabin pressure and outside pressure. In the second embodiment a constant difference in pounds per square inch, or inches of mercury, is maintained. The second pilot device in each case is adapted to control the communication of the bellows which directly actuates the cabin vent valve with external pressure and also permits the bleeding of cabin pressure into the bellows. Each pilot mechanism regulating cabin pressure at high altitudes has an area constantly subjected to external pressure and another area subjected to cabin pressure, and in the preferred embodiment, due to the use of a multiple bellows arrangement, there is an additional area subjected to cabin pressure which, since the space between the multiple bellows is evacuated, is not opposed by any substantial gaseous pressure at all. In both embodiments of the invention means is provided for de-icing the vent valve. In the preferred embodiment this mechanism includes cam devices rotatable about the axis of movement of the vent valve; in the other embodiment it includes a manually or manually and spring reciprocated plunger connectible at will to the operating stem of the cabin vent valve. It will be clear that I have provided a simple, compact and effective arrangement for providing the desired controls of cabin pressure; and, in the different forms, means is provided for accomplishing either a constant differential between cabin and external pressures, or a constant ratio of cabin to external pressure, in each case power being conserved since the terminal pressure (cabin pressure) against which the pumping device which supplies air to the cabin delivers air is kept closer to initial pressure; and in each case danger of rupture of the cabin through an excessive difference between internal and external pressures is avoided.

While there are in this application specifically described two forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In combination, in a controlling mechanism, a control valve, and actuating means for said valve including an evacuated bellows having an end movable to actuate said valve and a relatively stationary end, a spring acting in a direction to expand said bellows, means for subjecting the exterior of said bellows to a pressure to be controlled, and means surrounding said bellows for adjusting the pressure exerted by said spring while leaving the position of said relatively stationary end unchanged.

2. In combination, in a controlling mechanism, a control valve, and actuating means for said valve including an evacuated bellows, a spring surrounding said bellows and acting in a direction to expand said bellows, means for subjecting the exterior of said bellows to a pressure to be controlled, and means surrounding said bellows and said spring for adjusting the pressure exerted by said spring while leaving the position of said relatively stationary end unchanged.

3. In a valve mechanism, a valve seat, a valve movable relative to said seat, an expansible chamber device for actuating said valve, and a pilot valve mechanism for controlling the flow of fluid relative to said expansible chamber device and received within said expansible chamber device, said pilot valve mechanism including a pilot valve and pressure responsive control means therefor.

4. In a valve mechanism, a valve seat, a valve movable relative to said seat, an expansible chamber device for actuating said valve including a bellows having one end thereof operatively connected to said valve and the other end thereof fixed, a mounting for the latter end of said bellows, a recessed closure member supported on said mounting and coacting with said bellows in the formation of an expansible chamber, and means for controlling the pressure within said expansible chamber including a valve seat supported by said mounting, a valve coacting with said seat, and operating means for said valve enclosed within said recessed closure member.

5. In a valve mechanism, a valve seat, a valve movable relative to said seat, an expansible chamber device for actuating said valve including a bellows having one end thereof operatively connected to said valve and the other end thereof fixed, a mounting for the latter end of said bellows, a recessed closure member supported on said mounting and coacting with said bellows in the formation of an expansible chamber, and means for controlling the pressure within said expansible chamber including a pilot valve and controlling means for said pilot valve within the recess of said closure member.

6. In a valve mechanism, a valve seat, a valve movable relative to said seat, an expansible chamber device for actuating said valve including a bellows having one end thereof operatively connected to said valve and the other end thereof fixed, a mounting for the latter end of said bellows, a recessed closure member supported on said mounting and coacting with said bellows in the formation of an expansible chamber, and means for controlling the pressure within said expansible chamber including a pilot valve and controlling means for said pilot valve including a bellows housed within the recess of said closure member.

7. In a valve mechanism, a valve seat, a valve movable relative to said seat, an expansible chamber device for actuating said valve, and pilot valve devices for controlling the flow of fluid relative to said expansible chamber device including valve means and alined operating devices for said valve means, one received within said expansible chamber device.

8. In a valve mechanism, a valve seat, a valve movable relative to said seat, an expansible chamber device for actuating said valve, and pilot valve mechanism for controlling the flow of fluid relative to said expansible chamber device including alined pilot valve devices and alined operating devices for said pilot valve devices, one received within said expansible chamber device.

9. In a cabin pressure controlling mechanism, a valve movable to control the pressure in a cabin whose pressure is to be controlled, an expansible chamber actuating means for said valve, means for subjecting the exterior of said actuating means to the pressures in the cabin, means providing a chamber communicating with the interior of said expansible chamber actuating means, means providing a connection with a point of reduced pressure, a valve for controlling communication between said connection-providing means and said chamber, means providing a continuous restricted communication between said chamber and the cabin whose pressure is to be controlled, and actuating means for said last mentioned valve including a spring and an evacuated bellows subjected externally to cabin pressure.

10. In a cabin pressure controlling mechanism, a valve movable to control the pressure in a cabin whose pressure is to be controlled, an expansible chamber actuating means for said valve, means for subjecting the exterior of said actuating means to the pressures in the cabin, means providing a chamber communicating with the interior of said expansible chamber actuating means, means providing a connection with a point of reduced pressure, a valve for controlling communication between said connection providing means and said chamber, means providing an annular passage coaxial with said second valve for effecting a continuous restricted communication between said chamber and the cabin whose pressure is to be controlled, and actuating means for said last mentioned valve including a spring and an evacuated bellows subjected externally to cabin pressure.

11. In a cabin pressure controlling mechanism, a valve movable to control the pressure to be controlled, an expansible chamber actuating means for said valve, means providing a chamber communicating with said expansible chamber actuating means, means providing a connection with a point of reduced pressure, a hollow valve for controlling communication between said connection-providing means and said chamber, means providing a continuous restricted communication between said chamber and a cabin whose pressure is to be controlled, and actuating means for said hollow valve including a bellows device subjected to cabin pressure and having its interior connected through said hollow valve with said connection-providing means.

12. In a cabin pressure controlling mechanism, a valve movable to control the pressure in a cabin whose pressure is to be controlled, an expansible chamber actuating means for said valve, means for subjecting the exterior of said actuating means to the pressures in the cabin, means providing a chamber communicating with the interior of said expansible chamber actuating means, means providing a connection with a point outside said cabin, a valve for controlling communication between said connection-providing means and said chamber, means providing a continuous restricted communication between said chamber and the cabin whose pressure is to be controlled, and actuating means for said last mentioned valve including a bellows device having its opposite surfaces subjected respectively to cabin pressure and to the pressure outside said cabin.

13. In a cabin pressure controlling mechanism, a valve movable to control the pressure in a cabin whose pressure is to be controlled, an expansible chamber actuating means for said valve, means for subjecting the exterior of said actuating means to the pressures in the cabin, means providing a chamber communicating with the interior of said expansible chamber actuating means, means providing a connection with a point outside said cabin, a valve for controlling communication between said connection-providing means and said chamber, means providing an annular passage coaxial with said second valve for effecting a continuous restricted communication between said chamber and the cabin whose pressure is to be controlled, and actuating means for said last mentioned valve including a bellows device having its opposite surfaces subjected respectively to cabin pressure and to the pressure outside said cabin.

14. In a cabin pressure controlling mechanism, a valve movable to control the pressure in a cabin whose pressure is to be controlled, an expansible chamber actuating means for said valve, means for subjecting the exterior of said actuating means to the pressures in the cabin, means providing a chamber communicating with the interior of said expansible chamber actuating means, means providing a connection with a point outside said cabin, a valve for controlling communication between said connection-providing means and said chamber, means providing a continuous restricted communication between said chamber and the cabin whose pressure is to be controlled, actuating means for said last mentioned valve including a bellows device comprising inner and outer bellows elements and means cooperating with said elements to enclose a chamber between them and to provide an end closure for the space surrounded by the smaller bellows, the space between said bellows being evacuated, and means for subjecting the space within the smaller bellows and the space outside of said bellows respectively to cabin and to outside-the-cabin pressures.

15. In a cabin pressure controlling mechanism, a valve movable to control the pressure in a cabin whose pressure is to be controlled, an expansible chamber actuating means for said valve, means for subjecting the exterior of said actuating means to the pressures in the cabin, means providing a chamber communicating with the interior of said expansible chamber actuating means, means providing a connection with a point outside said cabin, a valve for controlling communication between said connection-providing means and said chamber, means providing a continuous restricted communication between said chamber and the cabin whose pressure is to be controlled, actuating means for said last mentioned valve including a multiple bellows device enclosing an evacuated chamber and having unequal oppositely facing surfaces subjected respectively on the smaller of said surfaces to cabin pressure and on the larger of said surfaces to the pressure outside said cabin.

16. In a cabin conditions controlling system for aircraft, in combination, a valve, a valve seat, said valve having movable therewith a cylindrical sleeve, a stationary cylindrical sleeve coaxial with said first mentioned sleeve and having slots extending in parallelism with its axis, pins on said first mentioned sleeve extending through said slots, and a rotatable element having operating means and being slotted to provide surfaces to coact with said pins to move said valve positively in one direction relative to its seat and further to provide spaces to permit said valve to move freely in the same direction relative to said operating means.

17. In a cabin pressure control system for airplanes, in combination, a valve for controlling the communication of a cabin with the surrounding air, a valve seat, said valve having movable therewith a cylindrical sleeve, a stationary cylindrical sleeve coaxial with said first mentioned sleeve and having slots extending in parallelism with its axis, pins on said first mentioned sleeve extending through said slots, and a rotatable element slotted to provide surfaces to coact with said pins in certain positions of said rotatable element to effect rapid movement of said valve and to provide space for movements of said valve independently of said rotatable element in other positions of the latter.

18. In a cabin pressure control mechanism, a cabin vent valve, an expansible chamber actuating device for said vent valve, and controlling means for said expansible chamber actuating device including a plurality of pilot valves each having a valve-chamber-providing means with which it cooperates, each of said valve-chamber-providing means including a valve seat having a passage opening through the same and connected with the outer air, a chamber into which said passage opens through said seat and which has a connection with said expansible chamber actuating device, and means forming a conduit having a connection with the interior of the cabin, and actuating means for said pilot valves including expansible chamber devices each having a movable wall, each of said movable walls subjected on one side to cabin pressure and said movable walls, on their opposite sides, respectively subjected to the outer air and to a substantial vacuum.

19. In a cabin pressure control mechanism, a cabin vent valve, an expansible chamber actuating device for said vent valve, and controlling means for said expansible chamber actuating device including a plurality of pilot valves each having a valve-chamber-providing means with which it cooperates, each of said valve-chamber-providing means including a valve seat having a passage opening through the same and connected with the outer air, a chamber into which said passage opens through said seat and which has a connection with said expansible chamber actuating device, and means forming a conduit having a connection with the interior of the cabin, and actuating means for said pilot valves including expansible chamber devices each having a movable wall, each of said movable walls having on one side an area subjected to cabin pressure, one of said movable walls having on its opposite side an area subjected to a substantial vacuum, and the other of said movable walls having on its other side an area subjected to the outer air.

20. In a cabin pressure control mechanism, a cabin vent valve, an expansible chamber actuating device for said vent valve, and controlling means for said expansible chamber actuating device including a plurality of pilot valves each having a valve-chamber-providing means with which it ccoperates, each of said valve-chamber-providing means including a valve seat having a passage opening through the same and connected with the outer air, a chamber into which said passage opens through said seat and which has a connection with said expansible chamber actuating device, and means forming a conduit having a connection with the interior of the cabin, and actuating means for said pilot valves including expansible chamber devices each subjected upon an area thereof to cabin pressure and each including an evacuated bellows.

21. In a control valve mechanism, a control valve, a fluid actuated, expansible chamber device for actuating said valve, and a pilot valve mechanism for controlling the flow of fluid relative to said expansible chamber device, said pilot valve mechanism including a valve device and an expansible chamber operating means therefor both received within said expansible chamber device.

22. In a mechanism for controlling the air pressure in the cabin of an airplane, valve means movable to control the pressure in a cabin whose pressure is to be controlled, an expansible chamber actuating means for said valve means, means for subjecting the exterior of said expansible chamber actuating means to the pressures in the cabin, means providing a chamber communicating with the interior of said expansible chamber actuating means, means providing a connection with a point of reduced pressure, a valve for controlling communication between said connection-providing means and said chamber, means providing a continuous restricted communication between said chamber and the cabin, and actuating means for said valve including means for yieldingly acting on said valve and an expansible chamber device having a movable wall subjected at one side to cabin pressure and likewise acting on said valve.

23. In a mechanism for controlling the air pressure in the cabin of an airplane, valve means movable to control the pressure in a cabin whose pressure is to be controlled, an expansible chamber actuating means for said valve means, means for subjecting the exterior of said expansible chamber actuating means to the pressures in the cabin, means providing a chamber communicating with the interior of said expansible chamber actuating means, means providing a connection with a point outside the cabin, a valve for controlling communication between said connection-providing means and said chamber, means providing a continuous restricted communication between said chamber and the cabin, and actuating means for said valve including an expansible chamber device having a movable wall having its opposite surfaces subjected respectively to cabin pressure and to the pressure outside the cabin.

24. In aircraft comprising a pressure cabin and the means delivering air thereto at greater than atmospheric pressure, a cabin pressure control system comprising a valve in the cabin wall for bleeding air therefrom, an expansible chamber device for controlling the position of said valve, control means associated with said expansible chamber device for causing operation of said valve to maintain pressure within said cabin at a constant ratio to and above the surrounding atmospheric pressure at all flight altitudes above that altitude at which such ratio is attained through the decrease in external pressure due to increase in flight altitude while cabin pressure is maintained constant, and other control means associated with said expansible chamber device for causing operation of said valve, said other control means adjustable to equate cabin and atmospheric pressure altitude to different desired altitudes above sea level and including means for maintaining cabin pressure and atmospheric pressure substantially equal up to such selected level and for maintaining the cabin pressure constant at the selected pressure altitude during aircraft ascent until the aircraft pressure altitude is so reduced relative to the cabin pressure altitude that the ratio between cabin pressure and the surrounding atmospheric pressure becomes equal to the constant ratio factor of said first control means, whereafter, upon further increase in aircraft altitude, the constant ratio between cabin pressure and atmospheric pressure is maintained, each of said control means including a movable pilot valve having a stationary seat and governing flow of fluid relative to said expansible chamber device, said first mentioned control means including a bellows device comprising inner and outer bellows elements and means cooperating with said elements to enclose a chamber between them and to provide an end closure for the space surrounded by the smaller bellows, the space between said bellows being evacuated, and means for subjecting the space within the smaller bellows and the space outside of said bellows respectively to cabin and to outside-the-cabin pressures, and said second mentioned contral means including an evacuated bellows subjected externally to cabin pressure.

25. In combination, in an aircraft cabin pressure controlling apparatus, a valve movable to control outflow of air from an aircraft cabin, an expansible chamber device for controlling the movements of said valve including a movable element connected to said valve and subjected on one side thereof to cabin pressure to effect opening movement of said valve, means associated with said element and cooperating with the latter to form an expansible chamber the pressure within which acts upon the other side of said movable element and when at a predetermined value with respect to the cabin pressure acting on the first side of said element effects valve movement in a closing direction, means for admitting cabin pressure to said expansible chamber and venting it from said expansible chamber including a plurality of passages and pilot valves associated with two of said passages, an evacuated bellows subjected externally to cabin pressure controlling one of said pilot valves and a second bellows device subjected to ambient pressure and cabin pressure and controlling the other of said pilot valves, and means for enabling the movement of said first mentioned valve at will including a reciprocably mounted rod, grasping means carried by said rod by means of which it is movable longitudinally, and means carried by said rod and rotatable with the latter to effect an operative connection with said valve for the pushing or pulling thereof.

26. In a cabin pressure control mechanism, a cabin vent valve, an expansible chamber actuating device for said vent valve, and controlling means for said expansible chamber actuating device including a plurality of pilot valves each having a valve-chamber-providing means with which it cooperates, each of said valve-chamber-providing means including a valve seat having a passage opening through the same and connected with the outer air, a chamber into which said passage opens through said seat and which has a connection with said expansible chamber actuating device, and means forming a conduit having a connection with the interior of the cabin, and actuating means for said pilot valves including expansible chamber deviecs each having a movable wall, one of said movable walls subjected on one side to cabin pressure and on its other side to a substantial vacuum and the other of said movable walls subjected on one side to external pressure and on its other side in part to a substantial vacuum and in part to cabin pressure.

27. In a cabin pressure control system for airplanes, in combination, a valve for controlling the communication of a cabin with the surrounding air, a valve seat, said valve having movable therewith a cylindrical sleeve, a stationary cylindrical sleeve coaxial with said first mentioned sleeve and having slots extending in parallelism with its axis, pins on said first mentioned sleeve extending through said slots, and a rotatable element slotted to provide surfaces to coact with said pins on rotation of said rotatable element to raise said valve rapidly from its seat and also to provide spaces for free movement of said pins permitting said valve to move relative to said rotatable element to raise said valve rapidly from its seat.

28. In a mechanism for controlling the air pressure in the passenger compartment of an aircraft, valve means movable to control the pressure to be controlled, an expansible chamber actuating means for said valve means including a movable wall hermetically sealing the spaces at its opposite sides from intercommunication, means for connecting the space at one side of said movable wall with a point outside of the compartment, a valve for controlling the flow of fluid through said connecting means, means for providing a continuous restricted communication between the space at said side of said movable wall and the compartment whose pressure is to be controlled, said restricted communication occurring past said valve and independently of any control by the latter, actuating means for said valve including an expansible chamber device including a movable wall having its opposite surfaces subjected respectively to compartment pressure and to the pressure outside the compartment, and means for connecting the space at the other side of said first mentioned movable wall with the interior of said passenger compartment.

29. In a valve mechanism, in combination, a port, a valve seat surrounding said port, a valve cooperating with said valve seat for controlling the flow of fluid through said port, pressure responsive means for controlling the position of said valve relative to said valve seat, passage means for subjecting said pressure responsive means to the pressure conditions at the opposite sides of said valve seat having a communication with said pressure responsive means through which the flow in opposite directions relative to said pressure responsive means takes place, valve means for controlling communication between said pressure responsive means and the space at one side of said seat through said passage means, and means including an expansibe evacuated member subjected on its exterior to the pressures at the opposite sides of said seat for controlling said valve means.

30. In a unitary valve mechanism, in combination, a casing, valve means in said casing for controlling the flow of a fluid, pressure responsive means in said casing for controlling the position of said valve means, means in said casing for controlling the flow of pressure fluid relative to said pressure responsive means, and pressure responsive means in said casing including an expansible evacuated member having a movable wall subjected on one side to the pressures at one side of said valve means for controlling said fluid flow controlling means, said valve means, said pressure responsive means, said flow controlling means, and said second pressure responsive means all coaxially arranged and a plurality of the same so disposed relative to each other as to be cut by a common plane perpendicular to the axis of their coaxial arrangement.

31. In a valve mechanism, in combination, a port, a valve seat surrounding said port, a valve cooperating with said valve seat for controlling the flow of fluid through said port, pressure responsive means for controlling the position of said valve relative to said valve seat, valve means for controlling the flow of pressure fluid relative to said pressure responsive means including a valve device oppositely movable into positions in which there occur respectively a restricted flow in one direction past said valve to said pressure responsive means and an opposite flow relative to said pressure responsive means, and pressure responsive means including an expansible evacuated member subjected on its exterior to the pressures at one side of said valve seat for controlling said valve means.

32. In a valve mechanism, in combination, a port, a valve seat surrounding said port, a valve cooperating with said valve seat for controlling the flow of fluid through said port, pressure responsive means for controlling the position of said valve relative to said port, passage means for connecting said pressure responsive means to the spaces at the opposite sides of said seat including a passage through which each connection may be established, and separate passages one of which provides continuous communication with the space at one side of said seat and another of which is adapted to afford a connection between said first mentioned passage and the space at the other side of said seat, valve means for controlling the flow of fluid through said first mentioned passage and the other of said separate passages, and pressure responsive means subjected continuously to the pressures at the opposite side of said seat and operated at a predetermined pressure for effecting closure of said valve means.

33. In a unitary mechanism for controlling the air pressure in the cabin of an airplane, in combination, a casing, a vent valve in said casing for controlling the flow of pressure fluid relative to the cabin, pressure fluid responsive mechanism in said casing for controlling the position of said vent valve, and pilot valve mechanism in said casing including a control device responsive to pressure conditions inside and outside of the cabin, for controlling the flow of fluid with respect to said pressure fluid responsive mechanism, said vent valve, said pressure fluid responsive mechanism and said pressure conditions responsive flow-controlling device all coaxially arranged, and said pressure fluid responsive mechanism and said pressure conditions responsive device so relatively arranged that they are cut by a common plane perpendicular to the axis of said coaxial arrangement.

34. In a cabin pressure control system for airplanes, in combination, a valve for controlling the communication of a cabin with the surrounding air, a valve seat, said valve having movable therewith a cylindrical sleeve, a stationary cylindrical sleeve coaxial with said first mentioned sleeve and having slots extending in parallelism with its axis, pins on said first mentioned sleeve extending through said slots, and a rotatable element fixed against axial movement with respect to said stationary sleeve and having operating means and being slotted to provide surfaces to coact with said pins to move said valve positively in opposite directions relative to its seat, said rotatable element having also openings in communication with said slots and through which said pins extend in certain positions of said rotatable element, whereby said first mentioned sleeve and said valve may move independently of rotation of said rotatable element.

35. In a cabin pressure control apparatus for airplanes, in combination, a valve for controlling the communication of a cabin with the surrounding air, a seat for said valve, a valve stem, a guide for said stem, automatic operating means for said stem, a manually operable rod extending through said automatic operating means, means supporting said rod for longitudinal reciprocation, yieldable means for normally maintaining said rod outside the limits of the movement of said stem by said automatic operating means, and means for connecting said rod with said stem to enable said stem to be positively reciprocated by said rod.

WIN W. PAGET.

REFERENCES CITED

The following references are of record in the file of this patent:

UNITED STATES PATENTS

| Number | Name | Date |
|---|---|---|
| 68,733 | Grant | Sept. 10, 1867 |
| 98,749 | Dorst | Jan. 11, 1870 |
| 347,856 | Wiedling | Aug. 24, 1886 |
| 625,118 | Miller | May 6, 1899 |
| 1,155,576 | Isley | Oct. 5, 1915 |
| 1,178,422 | Smolarek | Apr. 4, 1916 |
| 1,209,753 | Phillips | Dec. 26, 1916 |
| 1,499,578 | Hera | July 1, 1924 |
| 1,508,398 | Kelly | Sept. 16, 1924 |
| 1,508,731 | Standerwick | Sept. 16, 1924 |
| 1,511,406 | Frankenberg | Oct. 14, 1924 |
| 1,575,725 | Stewart | Mar. 9, 1926 |
| 1,610,683 | Kellan | Dec. 14, 1926 |
| 1,627,628 | Anderson | May 10, 1927 |
| 1,658,928 | Langdon | Feb. 14, 1928 |
| 1,795,288 | Browne | Mar. 10, 1931 |
| 1,858,590 | Henion | May 17, 1932 |
| 1,866,431 | Swindler | July 5, 1932 |
| 1,888,392 | Penick | Nov. 22, 1932 |
| 1,956,004 | Carson | Apr. 24, 1934 |
| 1,957,951 | Gaertner | May 8, 1934 |
| 1,965,322 | Steen | July 3, 1934 |
| 2,002,057 | Gregg | May 21, 1935 |
| 2,022,430 | Nold | Nov. 26, 1935 |
| 2,065,167 | Wirth | Dec. 22, 1936 |
| 2,208,554 | Price | July 16, 1940 |
| 2,214,963 | Jurs | Sept. 17, 1940 |
| 2,265,461 | Wagner | Dec. 9, 1941 |
| 2,289,639 | Fausek et al. | July 14, 1942 |
| 2,307,199 | Cooper | Jan. 5, 1943 |
| 2,313,149 | Jacobson | Mar. 9, 1943 |
| 2,419,707 | Cooper et al. | Apr. 29, 1947 |
| 2,425,000 | Paget | Aug. 5, 1947 |
| 2,450,881 | Cooper et al. | Oct. 12, 1948 |

FOREIGN PATENTS

| Number | Country | Date |
|---|---|---|
| 497,582 | France | Sept. 18, 1919 |
| 521,623 | Great Britain | May 27, 1940 |
| 679,386 | France | Jan. 9, 1930 |